No. 686,350. Patented Nov. 12, 1901.
A. A. SEELEY & C. SILET.
STRONG CURRENT PROTECTOR.
(Application filed Feb. 4, 1901.)
(No Model.) 2 Sheets—Sheet 1.
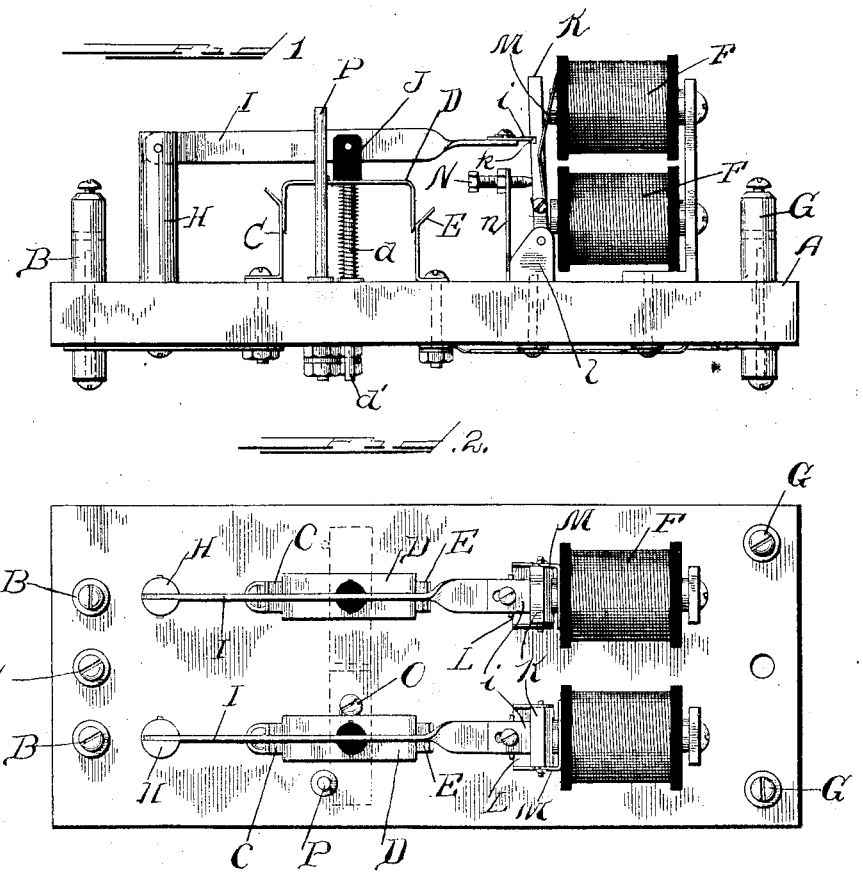

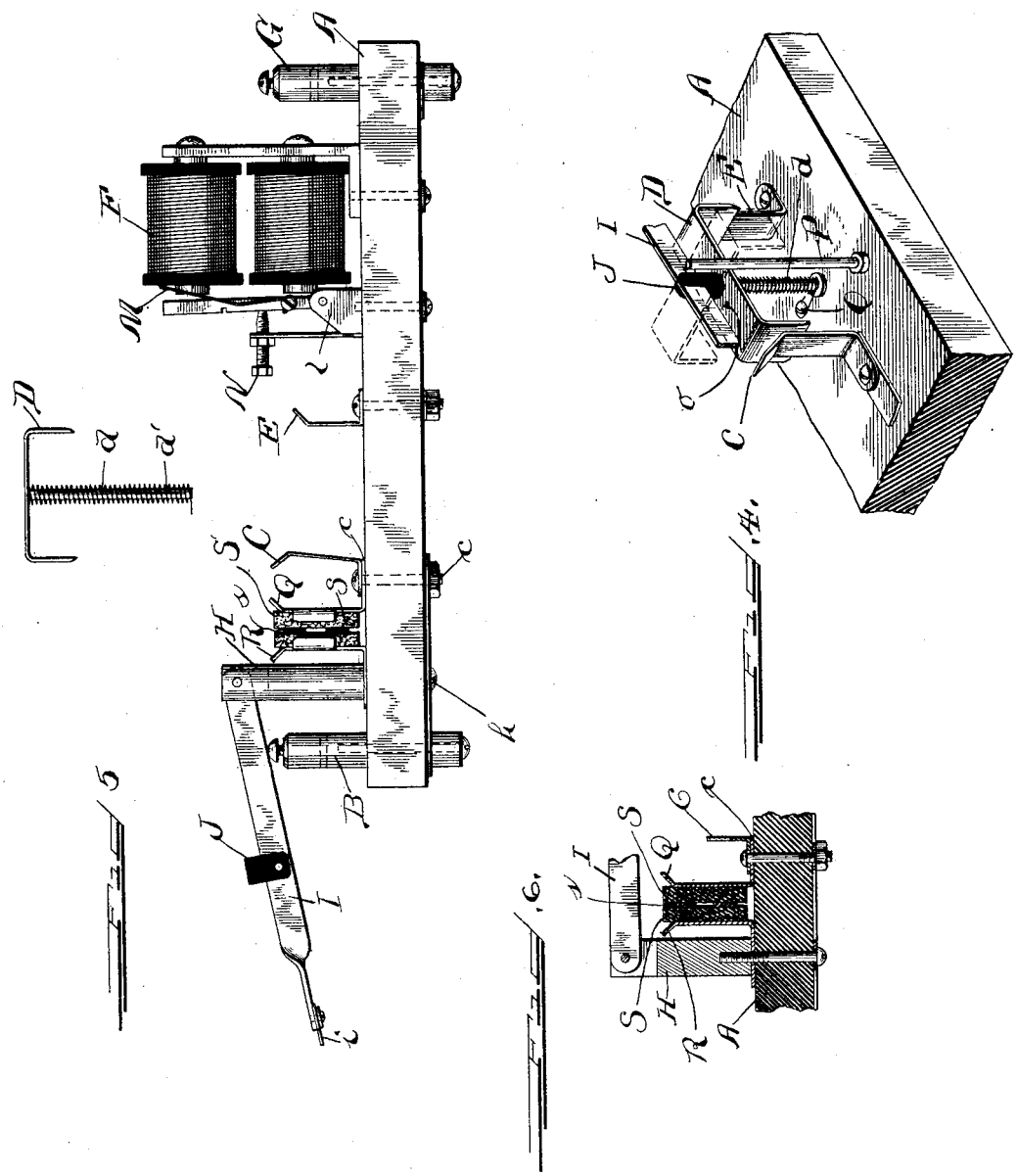

UNITED STATES PATENT OFFICE.

AARON A. SEELEY AND CHARLES SILET, OF CHICAGO, ILLINOIS.

STRONG-CURRENT PROTECTOR.

SPECIFICATION forming part of Letters Patent No. 686,350, dated November 12, 1901.

Application filed February 4, 1901. Serial No. 45,961. (No model.)

*To all whom it may concern:*

Be it known that we, AARON A. SEELEY and CHARLES SILET, citizens of the United States, residing at Chicago, in the county of Cook and State of Illinois, have invented certain new and useful Improvements in Strong-Current Protectors, of which the following is a specification.

Our invention relates to improvements in that class of devices for protecting electrical instruments against the action of electric currents of excessively high electromotive force which operate by automatically breaking the circuit in which such instruments are interposed whenever the strength of the electric current exceeds a predetermined limit.

The object of our invention is to provide a compact self-contained device for automatically throwing open an electric circuit whenever the strength of the current passing over such circuit shall exceed a predetermined limit.

Another object of our invention is to provide such a device which, while it will automatically protect instruments in the circuit from currents of excessively strong electromotive force, will do so in such a way that the circuit may be again closed immediately thereafter and the instrument simultaneously reset without delay, without the requirement of skill, and without renewing any parts.

Another object of our invention is to provide such a device which shall simultaneously throw open the circuit in which it is interposed and close a local circuit, whereby an alarm or signal may be given indicating that the main circuit has been broken and at what point, thus enabling an operator to immediately proceed to the requisite point and reestablish the circuit.

A further object of our invention is to provide such a device which shall be so adjustable that the same instrument may be set so as to automatically operate to break the circuit when the strength of the current passing therethrough shall exceed varying predetermined limits, as may be deemed desirable from time to time.

These and such other objects as may hereinafter appear are attained by the devices illustrated in the accompanying drawings, in which—

Figure 1 is a side elevation of our device. Fig. 2 is a plan view of our device seen from above. Fig. 3 is a plan view seen from below. Fig. 4 is a detail illustrating more clearly the operation of our automatic cut-out. Fig. 5 shows a modified form of our device; and Fig. 6 is a sectional detail through a portion of our device, showing how a lightning-arrester may be interposed therein.

Similar letters of reference indicate the same parts in the several figures of the drawings.

Referring by letter to the accompanying drawings, A is a base, of any suitable insulating material—such, for instance, as slate—upon which are mounted binding-posts B, to which the line-wires of an electric circuit are connected. These binding-posts are electrically connected—as, for instance, by the metallic strip $b$, Fig. 3—with the spring terminals or electrodes C, which in turn are electrically connected, by means of the bridges D, with the spring terminals or electrodes E, which are again connected by any suitable electrical conductor, as $e$, Fig. 3, with one end of the coils with which the electromagnets F are wound, the other ends of these coils being electrically connected with the binding-posts G, to which are attached the circuit-wires leading to the instrument or instruments interposed in such circuit. Also mounted upon the base A are the posts H, to which are pivotally attached the retaining-arms I, upon which are mounted the insulating-buttons J. Each retaining-arm I is also preferably provided with the adjustable tongue $i$, which is adapted to engage a slot $k$ in the armatures K. Said armatures are pivotally mounted between the lugs $l$ of the plate L.

M is an armature-spring adapted to hold the armature in opposition to the attraction of the electromagnets F.

N is an armature-adjustment screw mounted upon the stem $n$ of the plate L.

$d$ represents springs adapted to throw their respective bridges D out of contact with the electrodes C E.

In the preferred form of our device is a coiled spring mounted upon the stem $d'$ of the bridge D and having its upper end secured to the bridge D, as at o, Fig. 4, and having its lower end attached to the binding-screw O, said binding-screw connecting with the line-wires of a local alarm-circuit, and in our preferred construction an electrode P is also mounted upon the base A and at one side of one of the bridges D, said electrode constituting the other terminal of said local alarm-circuit.

It is well understood that if electrical instruments—such as telephones, electric lights, and other electrically-operated devices—are subjected to the action of a current of greater strength or higher electromotive force than the electrical capacity of such instruments the action of such excessive current will result in seriously damaging or even destroying such instruments or parts thereof, with consequent delay until the instruments can be repaired or replaced. The desirability of a device which shall automatically and instantaneously break the circuit at a suitable point, so as to protect such instrument whenever from any cause an excessively strong current shall be thrown into the circuit, is quite apparent, and various means have been devised to accomplish this purpose, one of the commonest being fusible plugs, which are interposed in the circuit and which are melted, so as to break the circuit, whenever subjected to an excessively strong current. When this happens, the plugs so fused must be located and replaced, a proceeding requiring some skill and often causing a considerable delay until the fused plugs are found and a skilled electrician can be procured to replace them, the instruments, lights, &c., dependent on such electrical circuit being meanwhile out of service. There are also disadvantages attending the use of fusible plugs in attempting to gage or adjust the point at which they will promptly fuse.

Our improved device may be readily set so as to be operated by a current of practically any strength which may be decided upon, and when the current reaches that point our device operates instantaneously and positively, but without the destruction of any of the parts, and is ready to be instantly reset, so as to effectively reëstablish the circuit and so as to be ready to immediately again break the current whenever the strength of the current shall reach the same predetermined point.

The operation of our device is as follows: The device being set as shown in Fig. 1 and attached to the line-wires of an electric circuit at the binding-posts B B G G, the current will come in through one binding-post B and will thence pass along the metallic strip b to the electrode C, across the bridge D to the electrode E, through the conductor e, through the coils of the electromagnets F, the respective coils of each pair of magnets being oppositely wound, thence to one binding-post G, and out on the line and through any instrument or instruments interposed on the line. The current then comes back to the other binding-post G and thence continues back through the other pair of electromagnets and the other electrodes, bridge, &c., to the other binding-post B and thence out to the line and back to the dynamo. With the current turned on, as described, the electromagnets exert a continuous attractive force upon the armatures K, the force of which is counteracted by three opposing elements: first, the distance between the electromagnets and the opposing faces of the armatures; second, the opposing force of the armature-springs M, and, third, the friction between the opposing surfaces of the slots $k$ on the armatures and the terminal tongues $i$ upon the controlling-arms I, said opposing surfaces being held in forcible contact by the pressure of the springs $d$ exerted upwardly against the bridges D and through them against the insulating-buttons $j$, attached to the arms I.

Whenever the strength of the current passing through our instrument is sufficient to so strongly magnetize the magnets F that the magnetic attraction exerted by them is sufficient to overcome these opposing forces, then armatures K are drawn to the magnets, thereby releasing or tripping the arms I, which, together with the bridges D, are immediately thrown upwardly or outwardly from the base-plate A, and in our preferred construction as soon as the faces of the angular arms of the bridges D are carried out of contact with the electrodes C E the spring $d$ throws the bridges D to a position at right angles to the position occupied by them when the instrument was set. When this happens, the terminal P, which acts as a stop to the rotation of the bridge D, makes electrical contact with the bridge D, and thereby a local circuit passing through the binding-screw O, the spring $d$, the bridge D, and the terminal P is closed and an alarm or signal of any suitable character is given, indicating that the circuit has been broken. This alarm can, if desired, be made to indicate the exact point at which the break in the circuit has occurred. In the simpler form of our device (shown in Fig. 5) no such local circuit is provided, and the action of the coil-spring $d$ simply results in throwing the bridge D upwardly or outwardly out of contact with the electrodes C E.

If our device is used on a grounded circuit, then it may be constructed in its simplest form, comprising only one set of binding-posts, electrodes, and electromagnets and only one arm, bridge, and armature; but where it is used in a metallic circuit it is necessary in order to prevent any possibility of the circuit being carried through the ground to the instrument, as may very readily happen if such a lightning-arrester as is shown in Fig. 6 is used with our device, that our device should be constructed in pairs, as shown in Figs. 2 and 3.

By controlling the three influences or forces which oppose the magnetic action of the electromagnets upon the armatures we obtain any desired adjustment in setting our apparatus. The armature-spring, which may be any suitable form of spring, as well as that shown in the drawings, may be put under greater or less tension, as may be desired. By means of the adjustment-screw N and the adjustable tongue $i$ the space between the opposing faces of the armature and electromagnets may be lessened or increased at will, and by means of the adjustable tongue $i$ the trip may be adjusted as delicately as occasion may require.

We find that by making one of the electrodes, as E, in such form that the bridge D will not be brought in contact therewith until the tongue or plate $i$ is about to engage the slot $k$ the annoyance of having the armature drawn to the electromagnets just before the trip is set may be avoided.

In Fig. 6 we have shown in vertical section a lightning-arrester which may be conveniently interposed in our device, as shown in Fig. 5. This arrester consists of a pair of terminals or electrodes Q R, to the opposing faces of which are secured sections of carbon S, which are separated by small strips of rubber or other insulating material $s$. The terminal Q is electrically connected with the terminal C and with the base A by the screw $c$, which passes through the base A. The terminal R may be conveniently secured to the base A by means of the screw $h$, which passes through the base A and into the standard H, between which and the upper surface of the plate the horizontal portion of the terminal R may be firmly secured, and by means of the screw $h$ the terminal R may be electrically connected in any convenient manner with a binding-post, to which is attached a ground-wire.

When our device is used in the form shown in Fig. 2 for a metallic circuit, we prefer to use two of these lightning-arresters, the electrodes Q being respectively connected with the electrodes C and the electrodes R being respectively connected with the standards or posts H. When this is done, we find a convenient way of connecting the two lightning-arresters with the ground consists in securing to the bottom of the base A a metallic strip T by means of the screws $h$ and the screw $u$, which latter screw passes through the base and secures the binding-post U to the upper surface of the base. This binding-post is intended for connection with a ground-wire.

Having thus described our invention, what we claim, and desire to secure by Letters Patent, is—

1. In an automatic cut-out device, the combination of a pair of terminal electrodes, a spring-actuated bridge normally out of contact with said electrodes, an arm detached from said bridge adapted to hold said bridge against spring-pressure so as to electrically connect said electrodes, said arm being held in closed position by engaging a catch upon an armature, and an electromagnet adapted to release said catch, substantially as described.

2. In an automatic cut-out device, the combination of a pair of terminal electrodes, a bridge located therebetween but normally out of contact therewith, an arm detached from said bridge adapted to hold said bridge against spring-pressure between said electrodes so as to electrically connect the same, a pivoted armature, a catch thereon adapted to engage and hold said arm in closed position, and an electromagnet adapted to release said catch, substantially as described.

3. In an automatic cut-out device, the combination of a pair of terminal spring-electrodes, a bridge normally out of contact therewith, means detached from said bridge for holding said bridge wedged between said electrodes and against spring-pressure, an armature, a catch thereon adapted to hold said bridge-confining means in closed position, and an electromagnet adapted to release said catch, substantially as described.

4. In an automatic cut-out device, the combination of a pair of terminal electrodes, a spring-actuated bridge adapted to electrically connect the same but normally out of contact therewith, a pivoted arm detached from said bridge and adapted to hold said bridge against spring-pressure and in contact with said terminal electrodes so as to electrically connect the same, an armature, a catch upon said armature adapted to engage and hold said arm in closed position, an electromagnet adapted to actuate said armature so as to release said catch, and adjustable means for holding said armature in opposition to the electromagnetic force of said magnet, substantially as described.

5. In an automatic cut-out device, the combination of a pair of terminal electrodes, a bridge adapted to connect said electrodes but normally out of contact therewith, means for normally holding said bridge out of contact with said electrodes, a pivoted arm detached from said bridge adapted to hold said bridge in contact with said electrodes, an electromagnet, an armature actuated thereby, and a catch upon said armature adapted to engage and hold said arm in closed position, substantially as described.

6. In an automatic cut-out device, the combination of a pair of terminal electrodes, a bridge adapted to electrically connect the same but normally out of contact therewith, means detached from said bridge for normally holding said bridge at an angle to the position occupied by it when in contact with said electrodes, means detached from said bridge for holding said bridge in contact with said electrodes, an armature, a catch upon said armature adapted to hold said arm in position for keeping said bridge in contact with said electrodes, and an electromagnet adapted to actuate said armature so as to release said arm, substantially as described.

7. In an automatic cut-out device, the combination of a pair of terminal electrodes, a bridge adapted to electrically connect the same but normally out of contact therewith, means for normally holding said bridge at an angle to the position occupied by it when in contact with said electrodes, an arm adapted to hold said bridge in contact with said electrodes, an armature, a catch upon said armature adapted to hold said arm in position for keeping said bridge in contact with said electrodes, an electromagnet adapted to actuate said armature so as to release said arm, and a local circuit which is closed by said bridge when in its normal or released position and which is broken when said bridge is in contact with said electrodes, substantially as described.

8. In an automatic cut-out device, the combination with a base, of a pair of terminal electrodes, a bridge adapted to electrically connect said electrodes but normally out of contact therewith, means for normally throwing said bridge out of contact with said electrodes, an electric circuit closed by said bridge when in its normal position and broken when said bridge is in its set position, an arm detached from said bridge for holding said bridge in its set position in contact with said electrodes, an armature, a catch adapted to hold said arm in its closed position and actuated by the movement of said armature, and an electromagnet adapted to actuate said armature so as to release said catch, all of said parts being mounted upon said base, substantially as described.

9. In an automatic cut-out device, the combination of a base, a pair of spring-electrodes, a T-shaped bridge mounted therebetween and adapted to connect said electrodes but normally held out of contact therewith, a spring mounted upon the stem of said bridge and adapted to throw said bridge when released out of contact with said electrodes, a pivoted arm adapted to hold said bridge in contact with said electrodes, a pivoted armature, a catch upon said armature, adjustable means upon said arm for engaging said armature, an electromagnet adapted to actuate said armature so as to release said catch, and adjustable means for holding said armature away from said electromagnet, substantially as described.

AARON A. SEELEY.
CHARLES SILET.

Witnesses:
F. H. DRURY,
O. R. BARNETT.